(12) United States Patent
Miseldine et al.

(10) Patent No.: US 10,853,396 B2
(45) Date of Patent: Dec. 1, 2020

(54) INTELLIGENT NATURAL LANGUAGE QUERY PROCESSOR

(71) Applicant: SAP SE, Walldorf (DE)

(72) Inventors: Philip Miseldine, Karlsruhe (DE); Joerg Goeppert, Karlsruhe (DE); Klaus Herter, Leimen (DE)

(73) Assignee: SAP SE, Walldorf (DE)

( * ) Notice: Subject to any disclaimer, the term of this patent is extended or adjusted under 35 U.S.C. 154(b) by 304 days.

(21) Appl. No.: 15/852,084

(22) Filed: Dec. 22, 2017

(65) Prior Publication Data

US 2019/0197185 A1     Jun. 27, 2019

(51) Int. Cl.
| | |
|---|---|
| *G06F 16/33* | (2019.01) |
| *G06F 16/35* | (2019.01) |
| *G06N 20/00* | (2019.01) |
| *G06N 7/00* | (2006.01) |

(52) U.S. Cl.
CPC .......... *G06F 16/3344* (2019.01); *G06F 16/35* (2019.01); *G06N 7/005* (2013.01); *G06N 20/00* (2019.01)

(58) Field of Classification Search
CPC ..... G06F 16/3344; G06F 16/35; G06N 20/00; G06N 7/005
USPC ........................................................ 707/737
See application file for complete search history.

(56) References Cited

U.S. PATENT DOCUMENTS

| | | | |
|---|---|---|---|
| 8,661,555 B2 | 2/2014 | Miseldine et al. | |
| 10,446,147 B1 * | 10/2019 | Moniz ................... | G06F 40/205 |
| 2010/0262836 A1 | 10/2010 | Peukert et al. | |
| 2016/0179934 A1 * | 6/2016 | Stubley ............... | G06F 16/3329 707/722 |
| 2017/0046124 A1 | 2/2017 | Nostrant | |
| 2017/0109029 A1 | 4/2017 | Lee et al. | |
| 2017/0177088 A1 | 6/2017 | Miseldine | |
| 2017/0200133 A1 | 7/2017 | Werner et al. | |
| 2018/0032505 A1 | 2/2018 | Hoetzer | |
| 2019/0306107 A1 * | 10/2019 | Galbraith ................ | G06F 9/547 |

FOREIGN PATENT DOCUMENTS

WO     2017/106531     6/2017

OTHER PUBLICATIONS

EP Extended European Search Report in Appln. No. 10193366.4, dated Nov. 26, 2018, 7 pages.

* cited by examiner

*Primary Examiner* — Evan Aspinwall
(74) *Attorney, Agent, or Firm* — Fish & Richardson P.C.

(57) ABSTRACT

A system for answering a natural language query (NLQ) directed to a database system. The system includes a query receiver receives the NLQ and models the NLQ as a tuple of entities including at least a subject entity and an intention entity. The system further includes a service discovery component and a query transformation unit. The service discovery component discovers a specific database system asset for answering the NLQ by evaluating system model descriptions of database system assets against the NLQ. The query transformation unit transforms the NLQ into a native service call for the specific database system asset, and invokes the native service call for callback of the specific database system asset to answer the NLQ.

17 Claims, 7 Drawing Sheets

INTELLIGENT NATURAL LANGUAGE QUERY PROCESSOR

TECHNICAL FIELD

This description generally relates query processing. The description, in particular, relates to systems and techniques for mapping natural language queries to native system calls of a computer system.

BACKGROUND

Natural language queries have ambiguity in their language expressions or utterances. As an example, a database object (e.g., "saleRefObj") may be an object representing a sales referral in a database. End-users may refer to SaleRefObj in natural language queries, for example, as a "sales referral," or indeed just as "the sale." Example natural language queries directed to SaleRefObj may, for example, be "show me my sales referrals," or "show me the sale I just made," etc. In the case of the "show me the sale I just made" query, the end-user may have possibly made many sales with correspondingly many SaleRefObjs. The natural language query expression "show me the sale I just made" is semantically unclear and imprecise as to which of the possibly many sales or SaleRefObjs the end-user is now seeking with the query. It may not be possible to properly or accurately map the natural language query to native system calls (which are formulated using unambiguous and precise formal query syntax) to get answers to the natural language query.

Consideration is now given to systems and techniques for mapping natural language queries to native system calls of a computer system.

SUMMARY

Systems and methods for answering a natural language query (NLQ) directed to a database system are disclosed herein.

In a general aspect, a method includes modelling the NLQ as a tuple of entities including at least a subject entity and an intention entity. The modelling of the NLQ involves semantic analysis of the NLQ. The method further includes discovering a specific database system asset for answering the NLQ by evaluating system model descriptions of database system assets against the NLQ, transforming the NLQ into a native service call for the specific database system asset, and invoking the native service call for callback of the specific database system asset to answer the NLQ.

In a general aspect, a system includes at least one processor and at least one memory storing instructions that are executable by the at least one processor. The system includes a query processor configured to answer a natural language query (NLQ) directed to a database system. In an aspect, the query processor includes a query receiver configured to receive the NLQ and model the NLQ as a tuple of entities including at least a subject entity and an intention entity. The modelling of the NLQ involves semantic analysis of the NLQ. The query processor further includes a service discovery component configured to discover a specific database system asset for answering the NLQ by evaluating system model descriptions of database system assets against the NLQ, and a query transformation unit configured to transform the NLQ into a native service call for the specific database system asset and invoke the native service call for callback of the specific database system asset to answer the NLQ.

The details of one or more implementations are set forth in the accompanying drawings and the description below. Further features of the disclosed subject matter, its nature and various advantages will be more apparent from the accompanying drawings, the following detailed description, and the appended claims.

BRIEF DESCRIPTION OF THE DRAWINGS

The accompanying drawings, in which like numerals indicate like components, illustrate embodiments of the disclosed subject matter.

DETAILED DESCRIPTION

In accordance with the principles of present disclosure, systems, system architectures, and methods (collectively "NLQ processing solutions") for answering natural language queries by system services in database systems are described herein.

In the NLQ processing solutions described herein, an incoming natural language query (NLQ) is modelled as a tuple of entities (e.g., [Subject, Intent, Criteria]). Database system assets (e.g., resources, objects, services, etc.) are described in a system model. The NLQ and system models are enriched by context and semantic analysis. Discovery of system assets for answering the NLQ is by subject and intention analysis. A text classifier matches the NQL to different system assets with different matching confidence levels. Machine learning results are used to resolve cases of ambiguous discovery (i.e., multiple query-asset matches).

Figure 1:
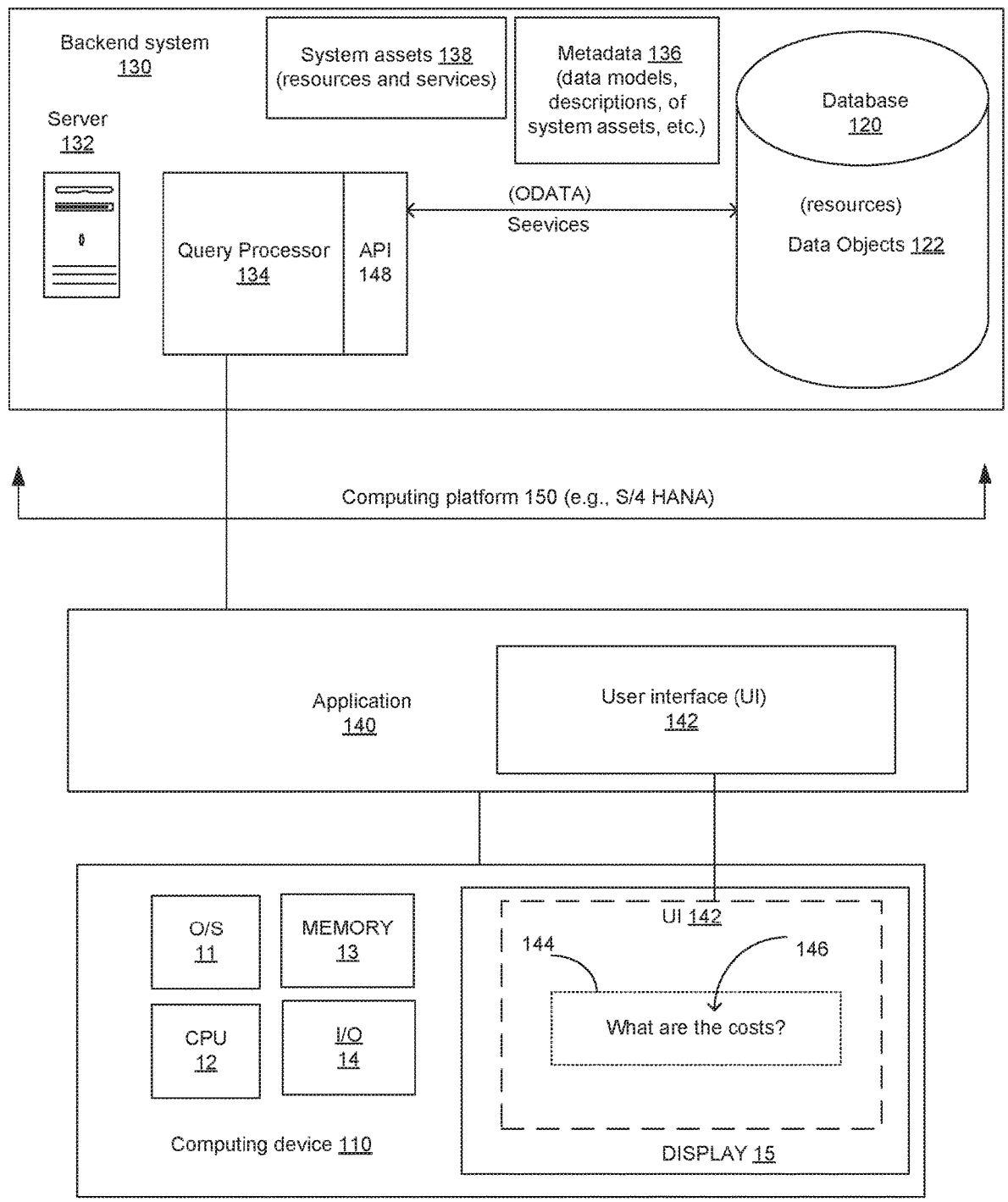
FIG. 1 is a block diagram illustration of an example system including an application that an end-user on a computing device can use to query sources of data, in accordance with the principles of the present disclosure.

FIG. 1 is a schematic block diagram showing an example system 100 including an application (e.g., application 140) that an end-user on a computing device (e.g. computing device 110) can use to query sources of data (e.g., database 120) via a backend computer system 130, in accordance with the principles of the present disclosure.

Backend computer system 130 may include a query processor 134, which is configured to process and answer queries (e.g., a formal language query, and or a natural language query) received in a context of the end-user, for example, via application 140.

Computing device 110, which includes an O/S 11, a CPU 12, a memory 13, and I/O 14, may include a user interface or display screen (e.g., display 15). Backend computer system 130 may similarly include one or more computers (e.g., server 132) that include computer components such as an O/S, a CPU, a memory, and I/O, etc. Although computing device 110 is illustrated in the example of FIG. 1 as a single computer, it may be understood that computing device 110 may represent two or more computers in communication with one another. Therefore, it will also be appreciated that any two or more components 120-148 of system 100 may similarly be executed using some or all of the two or more computers in communication with one another.

In an example implementation of system 100, backend system 130/server 132 may, for example, be hosted on, or configured as, a networked computing platform 150 (e.g., a cloud platform) in which a server (e.g., server 132) functions as, for example, a database server that provides services to store, retrieve, or analyze data (e.g., data objects 122 in database 120, or other networked data sources) as requested by applications (e.g., application 140). Networked computing platform 150 may, for example, be implemented on premise, or in the cloud, using commercially available computing platform products (e.g., SAP HANA). The computing platform may support services that allow end-users to develop and execute workflows that take data from pre-defined data stores (applications, Web services, flat-files, databases, etc.) and then allow the user to combine, transform, present, and refine that data, and output the results back to the same or different data stores.

In an example implementation, application 140 may include an application programming interface (e.g., API 148) for data interactions between application 140 and backend system 132/database 120. API 148 may, for example, be based on an ODATA application-level protocol. In addition to services for basic data manipulation capabilities (such as adding deleting and updating), API 148 may provide services such as filtering and navigation between related entities.

Backend system 130/server 132 may include metadata 136 that describes data models, descriptions of system assets 138 (i.e., system resources and services), etc.

Application 140 (which the end-user may use to query data sources) may, for example, be hosted or launched on a computer device 110 or another computer (e.g. backend system 130/server 132).

Application 140 may include an interactive frontend (e.g., UI 142) that is shown on display 15 of computing device 110. UI 142 may, for example, be constructed using standard components (e.g., generic user interface building blocks (UIBBs)) and/or custom-developed components for UI display entities, navigational components, and UI input elements.

An end-user may, for example, enter a query in a text field (e.g., text field 144) in UI 142 to retrieve or access data in database 120. Query processor 134 may process the query using services and native calls of backend system 132 to create, select, or and modify data in application 140/database 120.

In traditional implementations, formal query languages may be used to make queries having pre-defined syntax. Structured Query Language (SQL) may be used for queries, for example, when database 120 is a relational database. Formal query languages for other types of databases (such as NoSQL databases and graph databases) may include Cassandra Query Language (CQL), Neo4j's Cypher, Data Mining Extensions (DMX) and XQuery, etc.

The queries (which may be input by the end-user on UI 142) may accomplish a few different tasks to create, select, and or modify data in application 140. For example, the queries may be used to find specific data by filtering specific criteria. Queries may calculate or summarize data, as well as automate data management tasks. Other queries include parameter, totals, crosstab, make table, append, update and delete queries. For example, a parameter query can run variations of a particular query, which prompts an end-user to insert a field value, and then use that value to create the criteria, while a totals query can allow an end-user to group and summarize data. The queries input by the end user on UI 142 may use services and native calls of backend system 132 to create, select, and or modify data (data objects) in application 140/database 120.

In the context of data operations, data and or data objects may be referred to herein as "resources." Resources (e.g., in a database) may be accessed over a network using, for example, the Open Data Protocol (OData) protocol for the querying and updating of data utilizing existing Web protocols. OData, which is a REST-based protocol for querying and updating data can be built on standardized technologies such as HTTP, Atom/XML, and JSON.

In the implementations described herein, UI 142 may be a natural language user interface (LUI or NLUI) configured to accept natural language queries (NLQ) (e.g., query 146: "what are the costs?" shown, for example, in FIG. 1). Examples of UIs that accept and process natural language queries may include UIs that have been made available by assignee, for example, under brand names "CoPilot" or "EQuill." In such NLUI, linguistic phenomena such as verbs, phrases and clauses may act as UI controls for creating, selecting and modifying data in software applications. Natural language interfaces are traditionally sought after for their speed and ease of use, but most suffer due to the difficulties in understanding wide varieties of ambiguous input (e.g., fuzzy descriptions of intentions and subjects within a natural language query).

Figure 2:
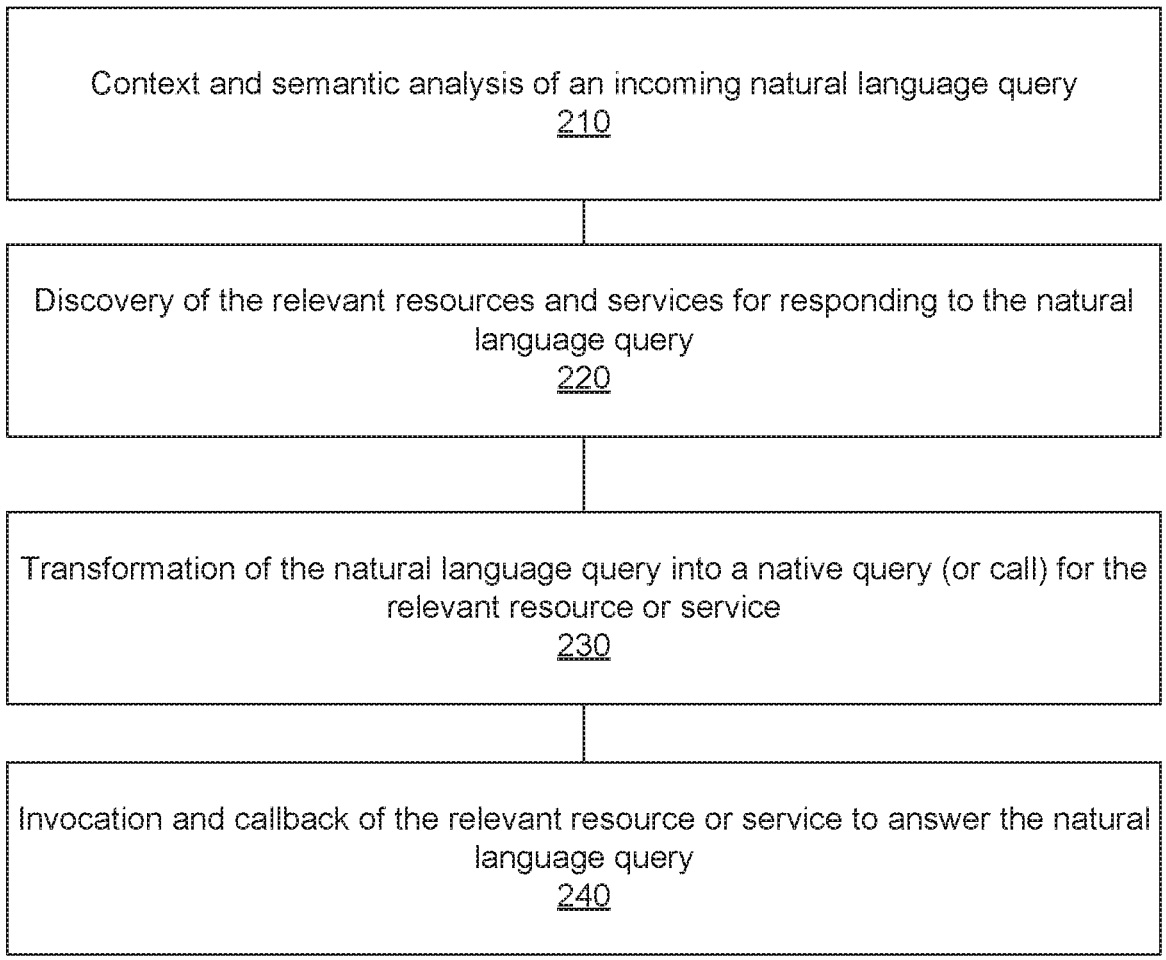
FIG. 2 is an illustration of an example method for answering of natural language queries with system services, in accordance with the principles of present disclosure.

FIG. 2 shows an example method 200 for answering of natural language queries with system services, in accordance with the principles of present disclosure.

Method 200 includes context and semantic analysis of an incoming natural language query (NLQ) (210), and discovery of the relevant resources and services for answering the natural language query (220). Method 200 further includes transformation of the natural language query into a native query (or call) for the relevant resource or service (230), and invocation and callback of the relevant resource or service to answer the natural language query (240).

The term "discovery" as used herein (e.g., as in contextual or semantic discovery of a query, resource or service) may be understood to have the same or similar meaning as the terms "identification," "determination," "interpretation," or "resolution" (e.g., as in identification, determination, interpretation, or resolution of a query, resource or service). Further, for convenience in description, the term "modelling" may be used interchangeably with the terms "analysis" or "mapping" herein. For example, "contextual analysis" and "semantic analysis" of a query may be referred to herein as contextual modelling or semantic modeling of the query, respectively. Further, the term "assets" may be used interchangeably, with the terms database "objects", "resources" and "services."

Method 200 may be implemented, for example, in system 100 or another database system.

The system architectures described herein may be designed to minimize modification of traditional systems and scale. While the methods or techniques described herein may be tailored for natural language query resolution, they may be applicable to a wide range of scenarios where services need to be discovered and invoked based on fuzzy descriptions of intentions and subjects within a query.

The NLQ processing solutions (i.e., systems, system architectures and methods) described herein may be based on deriving a hierarchical model of system assets (e.g., services, data, etc.) from existing metadata and descriptive assets (e.g., documentation, data associations) available for a computer system (e.g., system 100) that can be evaluated against a query modelled using similar entities (??), in accordance with the principles of the present disclosure. Machine learning techniques (e.g., text classification methods and neural networks) may be used to support mapping of inexact descriptive terms for assets and intentions (such as those widely used in natural language expressions) to actual system assets and for transformation of a natural language query into the corresponding native call. Further, to enhance the accuracy of the NLQ processing solutions, contextual information may be considered and used to enhance any given query. For instance, the context in which the query was made can be used to determine the types of database assets the user may be seeking with the query.

The NLQ processing solutions described herein, involve building text classification networks based on object documentation available in the system. Database objects (e.g., SaleRefObjects) may be richly described in natural language in the documentation. The database objects may be placed in object hierarchies which allow for domains and relationships between objects to be found. Using the NLQ processing solutions, the term SaleRefObj can, for example, be given a high confidence of being properly classified by the text string "sales referral" (as may appear often in its documentation), and the right "sale" being referred to by the user given the context of their current work (for example, in the context that the user is viewing a list of sales referrals).

In the context of data operations, data and or data objects may be referred to herein as "resources." Resources (e.g., in a database) may be accessed over a network using, for example, the Open Data Protocol (OData) protocol for the querying and updating of data utilizing existing Web protocols. OData, which is a REST-based protocol for querying and updating data can be built on standardized technologies such as HTTP, Atom/XML, and JSON.

Figure 3:
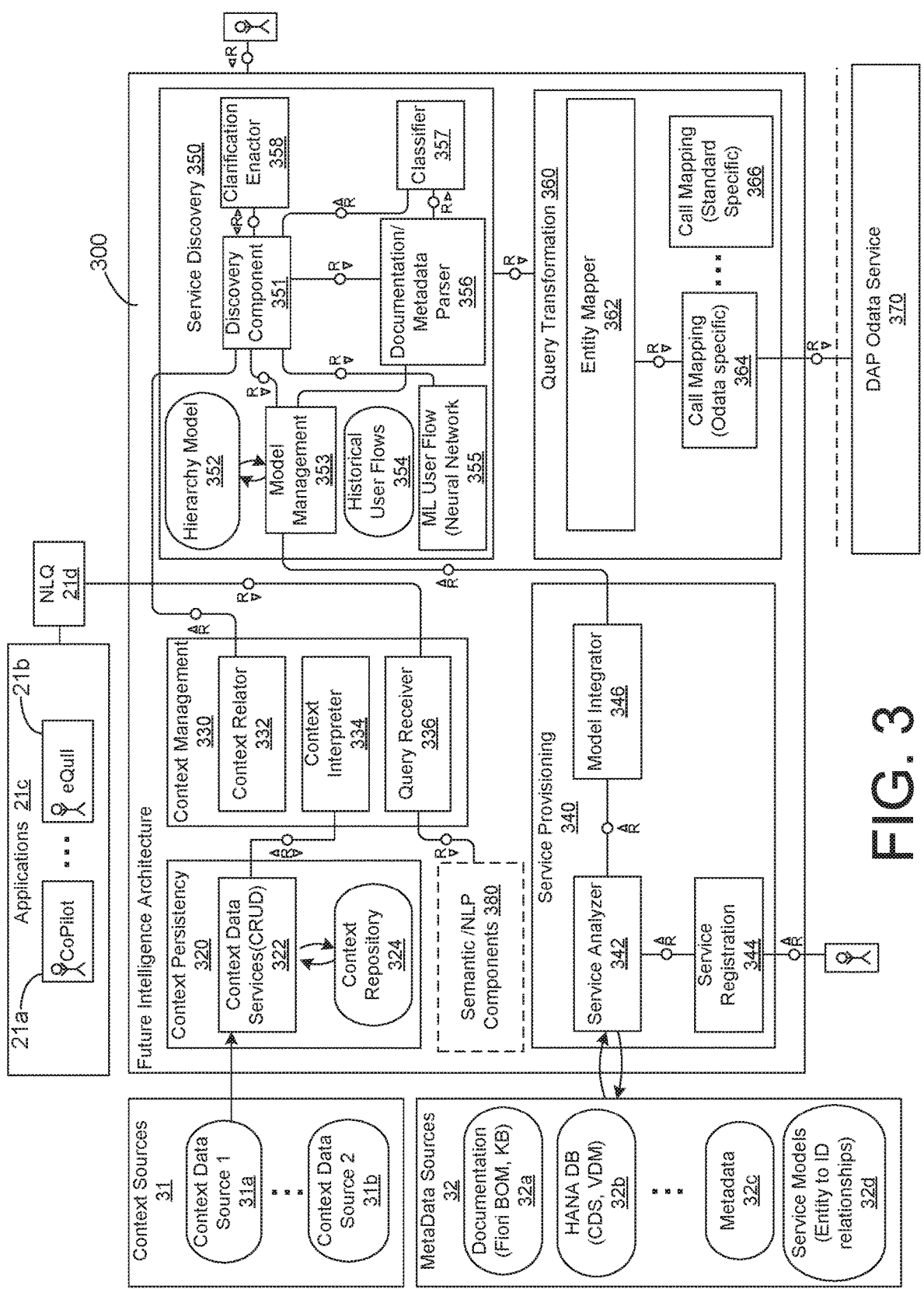
FIG. 3 is a block diagram illustration of example architecture of a natural language query processor, in accordance with the principles of the present disclosure.

FIG. 3 is a block diagram illustrating example architecture of a natural language query processor (e.g., query processor 300) that can be used by the NLQ processing solutions to transform a natural language query to a system query, in accordance with the principles of the present disclosure.

Query processor 300 may be coupled to an application (e.g., application 21c) having one or more user interfaces (e.g., Copilot 21a, eQuill 21b) that an end-user could use to enter queries (e.g., natural language queries) directed to, for example, database 120. Further, query processor 300 may utilize standard OData services 370 for data operations (e.g., querying and updating of data in database 120). For example, classic CRUD (Create Read Update Delete) operations can be exposed for a business object "saleLineItem" via an OData service.

Query processor 300 may enrich an incoming natural language query with a semantic model and associate it with a contextual model of the situation in which the query was asked.

Query processor 300 may utilize service discovery based on natural language descriptions of services, and other metadata and assets that can be used to enrich an understanding of those services and resources. In addition, query processor 300 may utilize modelling aspects which can interpret the context of the query to help predict and promote certain resources and services for discovery.

Core descriptions of services and resources may be built, and then modelled and evaluated against the incoming natural language query, for example, via a naïve Bayes text classification method. In example implementation, the models may be built on sources including one or more of Documentation; Fiori BOM; and Enterprise Search.

Contextual Analysis and Semantic Analysis

Query processor 300 may be configured to perform contextual analysis of an incoming NLQ to identify the intent of the literal user utterances in the NLQ. A NLQ can be enriched with "contextual" information based on an understanding of the user intention when inputting the NLQ. Such enrichment of the NLQ may improve analysis and mapping of the query against relevant business assets and invocations. Further, query processor 300 may be configured to perform semantic analysis of the query to determine the meaning of the NLQ (i.e., what is the subject of the statement, which actions the user wishes to perform, and what an appropriate response from the system should be). A NLQ can be enriched with "semantic" information based on the determination of the semantic meaning of the query. Like contextual information enrichment, semantic information enrichment of the query may improve analysis and mapping of the query against relevant business assets and service invocations The contextual and semantic enrichments of the NLQ may enable query processor 300 to discover the relevant system services and resources for the NLQ, and invoke the relevant system services and resources to produce a correct result for answering the NLQ.

Query processor 300 may model the NLQ in conjunction with any "system" modelling of system assets (i.e., services and resources) to establish a link between natural language expressions in the query and the system assets.

In example implementations of system modelling of system assets, OData services may expose an operation (i.e., an action that can take place on the modelled resource), the criteria or qualifiers of the operation (e.g., filters), and on which objects the action is to take place (i.e. the service itself). For example, classic CRUD (Create Read Update Delete) operations can be exposed for a business object "saleLineItem" via an OData service.

Further, query processor 300 may model the NLQ natural language queries based on grammar as having a subject, an optional auxiliary verb, a main verb and qualifiers. The verb usage in the NLQ may indicate the intent of the query.

Query processor 300 may match the topics or subjects of the NLQ to objects in the database, verbs to operations, and qualifiers to filters to determine which services should be invoked to answer the query.

For example, a natural language query of "show my sales from my suppliers" may be modelled as a set of subjects and verbs, such as:

[SaleLineItem, read] WHERE [suppliers=userID].

Classic CRUD operations can be exposed for a database object "saleLineItem" via an OData service.

A NLQ may not explicitly state the subject in terms of a database object, but rather state a token that represents an instance of the database object (e.g., the NLQ may refer to "XYZ" as a name of a company rather than as a "Company" object).

In accordance with the principles of a present disclosure, query processor 300 may model the NLQs as basic entity tuples [Subject (or Topic), Intent, Criteria], where each tuple element is resolved to database object model references. Each tuple element can be then mapped to a particular service call which can perform the intention on the subject with the given criteria.

As previously noted, contextual information is helpful in resolving the meaning of a natural language utterance in a NLQ. The contextual information may include different kinds of data from various sources (e.g., the system itself yielding authorizations or available apps of a user). Another example of a source of contextual information is a previous query (queries made within a particular session) which may be helpful in resolving the meaning of expressions referring to entities (such as "it", "that", "he/she", etc.) (e.g., in expressions such as "show me that supplier" or "OK. Show me its address"). In resolving the meaning of such expressions, it may be useful for the queries to provide a notion of state and session.

Each NLQ processed by query processor 300 may be associated with a contextual object that represents the assets and data surrounding a query, and which can help resolve referrals in the NLQ to those objects, in accordance with the principles of the present disclosure. Further, each query may be uniquely identifiable and referrable.

Hence, for context enrichment, the model of a NQL as basic entity tuples [Topic or Subject, Intent, Criteria], can be enhanced or enriched with both a unique ID for each query, and a context object which can be referred to and used to resolve associations between queries:

[QueryID, subject, intent, criteria].

Query processor 300 may provide a context object storage for each QueryID, which may be accessible via context [QueryID].property.

In this manner expressions such as "show me that supplier" and "OK. Show me its address" may be modelled by query processor 300 as:

---

[supplier, read, where supplierID = context[1].contract.supplierID]; and
[supplier.address, read, where supplierID = context[I].contract.supplierID]

---

Query processor 300 may consider sessions as being defined or formed over a time period or usage of an application (such as typical in classic web-based session management) and also as being defined or formed by context. Multiple queries can form a session, where the session has the same subjects or referral to the same query.

For example, consider the following example set of three queries:

Show me suppliers for this contract;
What is the weather in Berlin like this week?; and
Show me alternative suppliers in that city.

This example set of three queries may be answered by two independent objects, for example, a weather service for weather information, and a sales service for the sales (contracts) objects. However, the three queries in the set are related as they can provide contextual information for each other (e.g., by the criteria of the queries, "this week", "Berlin").

Modelling the example set of queries as a flat set of queries, makes it difficult to track which contextual information relates to which query. By differentiating the sessions based on the type of subjects being referred to, a richer (descriptive) model of the way in which the user is querying can be sought. Query processor 300 may use such richer model to track multiple queries that may be submitted by the end-user in a session.

In example implementations of query processor 300, multiple queries can form or define a session, where each session has the same subjects or referrals to the same query. Query processor 300 may extend or enrich the model of the NQL to be tuples [QueryID, SessionID, subject, intent, criteria], where session ID may be formed or defined based on a likelihood of matching subjects. Queries in the foregoing example set of three queries may be modelled as:

---

[1, 1000, supplier, read, where supplierID = context[1].contract.supplierID];
[2, 1001, weather, read, where city = Berlin]; and
[3, 1000, supplier, read, where supplierID != context[1].supplierID AND supplier.address.city != context[2].city].
respectively.

---

Queries are often made by end-users in an activity context or a work context (e.g., in response to viewing a certain web site, a work site, a business object, or in response to an event that occurred).

To aid in contextual discovery of a query and to increase accuracy of processing the query, sources of context information may be accessed for a contextual analysis. The context information may help identify the assets being referred to in the query by the user, or the assets that may be needed to answer the query.

Consider for example, the previously described example scenario in which the end-user is provided information that a supplier contract for a product is up for renewal. When the end-user then responds, for example, with the query "show me the supplier", it may be assumed that he or she is referring to the supplier of the contract in the given situation. Therefore, the context object of the end-user can be built from existing data interacted by the user (i.e., data that a supplier contract for a product is up for renewal). In general, context, subjects and previous query tuples may be derived from previous actions made by the user and used to enrich or enhance the contextual model of the user. The situation in the previously described example scenario in which the end-user is provided information that a supplier contract for a product is up for renewal, the context may be modelled, for example, in the same form as if the end-user himself or herself queried for that contract. A modelled context object may, for example, be:

[0, 1000, contract, read, where contractID=100021].

Then, when the user submits a query for the supplier (e.g., Show me suppliers for this contract), this foregoing modelled context object is now available to relate to the statement:

[1, 1000, supplier, read, where supplierID=context[0] .contract.supplier].

For convenience in description of the features and functions of query processor 300, reference is made to an example procurement scenario in which an enterprise or organization has a contract in place with a supplier to provide a certain number of units of a product. However, the contract may be nearing completion and requiring a decision on renewal. In this example procurement scenario, two different items of information may be required to make a contract renewal decision, namely, identification of the product within the contract, and details of the supplier. An end-user may use natural language querying to locate these two items of information (without having to use traditional formal language querying to find the two items of information) in a database. The end-user may, for example, submit natural language queries such as "show me product details" and "show me the supplier details" to identify the product and identify the supplier, respectively. The scenario may provide a context of the queries identifying the supplier and product in question. The scenario, however, may not provide the data behind the supplier or product. Example implemnations of query processor 300 may consider representative database objects of the supplier or product, which are modelled and exposed as OData services.

In example implementations in an S/4 HANA landscape, where an end-user may provide a natural language query to retrieve and manipulate assets stored within the landscape, query processor 300 may utilize models of data assets provided by S/4 HANA: (e.g., CDS views, VDM-based models, OData service models, etc.) and utilize S/4 HANA core services (e.g., HANA Text Analysis services, S/4 Situations, etc.) for service behaviors for processing natural language queries.

Query processor 300 may be configured to analyse these service descriptions and related assets (core data services (CDS) views, virtual data model (VDM) views, etc.) to build a description-based classification network that enables identification of which database object (and its related service) should be called to handle each of the two queries.

In some instances, the end-user may submit a follow-up query wanting to see alternative suppliers. To process such a follow-up query, query processor 300 may utilize external data sources via the S/4 Situations framework (e.g., Twitter, Ariba, etc.) and include behaviours to create contracts with new suppliers.

With renewed reference to FIG. 3, query processor 300 may include a semantic NLP engine 380 and additional modules or components (e.g., context persistency 320, context management 330, service provisioning module 340, service discovery module 350, and query transformation component 360, etc.) that are configured to facilitate context and semantic analysis of an incoming natural language query, discovery of the relevant resources and services able to respond to the query, transformation of the natural language query into a query native for the relevant resource or service, and invocation and callback of the relevant resource or service, in accordance with the principles of the present disclosure. A natural language utterance may be semantically analyzed while considering the context in which the utterance was made. Since language can be highly ambiguous, only contextual and situational cues may help proper understanding of the utterance. In example implementations, context may be determined over a session in which the end-user is using application 21c. A context CRUD service 322 (e.g., in context persistency module 320) may act to manage context objects that are related to the query. Each context object for a query may be calculated as a delta to others objects in a same session utilized by the end-user.

In query processor 300, context management module 330 may include a context relator 332, a context interpreter 334 and a query receiver 336. Query receiver 336 may receive a natural language query (e.g., NLQ 21d) input by the end-user, for example, on a user interface (e.g., Copilot 21a, eQuill 21b) of application 21c. In response, query receiver 336 may retrieve a current context object for the query (e.g., NLQ 21d). If the current context object does not exist (i.e., it is the beginning of a new session) then context interpreter 334 may retrieve and calculate the current user context from the various content data sources. Context interpreter 334 may store and maintain the current session of the query. Further, context interpreter 334 may also then store the current user context (e.g., by calling the context CRUD service 322 in context persistency module 320).

Query receiver 336 may also invoke a semantic NLP component (e.g., Semantic/NLP component 380, which may be a common off-the-shelf (COTS) component) to provide a breakdown of the query into a data model tuple whose entities include subjects, intentions, and criteria. Model entities received from Semantic/NLP component 380 for the query may be enriched contextually in context management module 330 by context relator 332.

Context relator 332 may include a context relator service that may supplement or complete elements of the query model that relate to previous queries or context data stored within the context associated with the query (and stored/retrieved from the context CRUD service). Context relator 332 may output the completed query model as output, for example, to service discovery module 350.

Query processor 300 may be coupled to a context source (e.g., context source 31) and metadata source (e.g. metadata sources 32) that can provide context contextual and situational cues toward proper understanding of the incoming natural language query. Context source 31 may, for example, include one or more context data sources (e.g., context data source 31a, context data source 31b, etc.). Metadata source 32 may, for example, include one or more metadata sources (e.g., documentation 32a (including, for example, Fiori Bill of Materials (BOM), knowledge bases (KB) or repositories of articles that provide knowledge on specific topics, and other documentation), HANA DB 32b (including, for example, CDS and VDM views), other metadata 32c, service models 32d (including, for example, entity to ID relationships), etc.).

Context data obtained from context source 31 by query processor 300 may include (1) system context data (including, for example, data emanating from the system, situations produced by the system (including, for example, business events present, such as financial periods, state changes to business objects, etc.), (2) user context data (e.g., habits data (including, for example, user interface interactions, business objects made by the user, actions of the user on the objects (e.g., viewed, modified, or shared), situations faced by the user, etc.), and (3) personal data (e.g., authorization, apps used, task assigned, organizational role or structure, etc.). In example implementations, query processor 300 may use the following sources for contextual information: S/4 Situations; Log files; and user identity systems (authorizations, roles etc.). In query processor 300, context persistency module 320 may utilize context data services 322 (e.g., a create, read, update, and delete (CRUD) service) to receive context data from context sources 31. Context data services 322 may persist the context data in a context repository 324, and supply the context data to context management module 330 (e.g., to context interpreter 334 in context management module 330).

Example Context Enrichment Scenario

To illustrate the concepts of context enrichment by query processor 300 described above, consider a scenario similar to the previously described example procurement scenario in which an enterprise or orgamization has a contract in place with a supplier to provide a certain number of units of a product. In the present scenario, the end-user in a new session related to the contract may be faced with a situation that contract number C0001 is almost complete, and requires a decision on renewal. The end-user may then submit one of two natural language queries: Q1: "product details?" and Q2: "supplier details?" via application 21c to query receiver 336. In response, query receiver 336 may try to retrieve a current context object for the end-user's session. As this is a new session for the end-user, context interpreter 334 may create a new context object, and analyze the different interactions the end-user may have had with the system in the current session. In the present scenario, context interpreter 334 may model the situation to provide a relation to a contract object (for the situation). Reference to the contract object may be then stored in the context object and persisted by context data services 322. The two natural language queries Q1: "product details" and Q2: "supplier details" may be sent to Semantic/NLP component 380 to be semantically analyzed into token model entities: subjects, intention, and criteria, as follows:

Q1: product—subject, details—intention, criteria—empty; and

Q2: supplier—subject, details—intention, criteria—empty.

Context relator 332 may receive, and associate the token model entities with the current context of the user to determine which product or which supplier the end-user may be referring to in the queries Q1: "product details" and Q2: "supplier details". The current context object for the session may include the situation and its associated object (i.e., contract number C0001). Context interpreter 334 may analyze the object model of contract number C0001 to ascertain whether it has any associated product or supplier objects. If matches are found for any associated product and supplier objects, context interpreter 334 may update the query model as follows:

Q1: product—subject, show—intention, criteria—productID=context.contract[C1001].productID Q2: product—supplier, show—intention, criteria—supplierID=context.contract[C1001].supplierID.

It will be noted that that no service has yet been discovered at this stage of query processing by query processor 300. The query model updated by context interpreter 334 is a model of the query in terms of a context, and a set of query tuples representing a subject—intention—criteria relationship:

{Context, [Subject, Intention, Criteria]}

Context relator 332 may forward the foregoing contextually updated query model to service discovery module 350 for discovery of services and resources to further semantically enrich the incoming queries.

Service and resource discovery services may be utilized to map this model to concrete business assets (i.e. services) that can respond appropriately to the query.

In an example implementation, for semantic analysis of the incoming query, query processor 300 may be configured to build a model of the query based on the following data sources: Enterprise Search; HANA Text Analysis; SAP Term; and existing ontology models.

Query processor 300 may utilize service discovery based on natural language descriptions of services, and other metadata and assets that can be used to enrich an understanding of those services and resources. In addition, query processor 300 may utilize modelling aspects which can interpret the context and query to help predict and promote certain resources and services for discovery.

Core descriptions of services and resources may be built, and then modelled and evaluated against the incoming natural language query via a naïve Bayes text classification method. In example implementation, the models may be built on sources including one or more of Documentation; Fiori BOM; and Enterprise Search.

In example implementations of query processor 300, after the relevant services for the query have been discovered, query transformation module 360 may transform the natural language query (using the semantic model of the query) into native calls to enact the services. Example implementations of query processor 300 may consider transformations for resources that support OData interfaces (e.g., via Sap Odata Services 370).

With renewed reference to FIG. 3, service discovery module 350 in query processor 300 may be configured to further semantically enrich the contextually enriched queries output by context management module 330. Service discovery module 350 may be configured to map the contextually enriched queries received from context management module 330 to actual assets (i.e. services and resources) of the system. The queries may be modeled such that the notion of "supplier" is discoverable both in the context and in the service infrastructure of the system.

Service and ResourceDiscovery

The contextual services described in the foregoing as provided by context management module 330 can yield a model of a query in terms of a context, and a set of query tuples representing a subject—intention—criteria relationships: {Context, [Subject, Intention, Criteria]}

Service and resource discovery services provided by service discovery module 350 in query processor 300 can map this model of the query to matching system assets (i.e., services) to answer the query.

The discovery services can have three different outcomes:
(1) No matching system asset is discovered
(2) Exactly one system asset is discovered (i.e., an exact match)
(3) Numerous (i.e., 1+) system assets are discovered The end-user may reject a discovered asset as being an incorrect match to the query, or choose a particular discovered asset that he or she considers to be a correct match. In the case where no system assets are discovered, the end-user may choose to select a system asset that he or she considers to be a correct match.

Ambiguity may also be present in what the end-user intends or wishes to do with the assets, i.e., intended actions. Does the end-user intend or wish to see the information graphically (i.e., via a chart) or in a tabular form? Often implementation of these intentions or wishes may determined by the types of services attached to the assets. If an analytical view and service is available, the system can, for example, show a chart-based visualization of the data to the end-user.

In a first case, the system may find no services to perform the end-user's intention or wish. In a second case, the system may have exactly one service available to perform the end-user's intention or wish. The system can accordingly call the one service to retrieve data according to the end-user's intention or wish.

In a third case, the system may have multiple services available to perform the end-user's intention or wish. In this third case, the system may be configured to invite the end-user selection of one of the multiple available services. The system can then accordingly call the selected service to retrieve data Once both the subject and intention of the query are determined, the service representing the system assets can be called, and the data displayed back to the user (and any actions that represent the intention such as Save, Create, etc.) can be performed.

Figure 4:
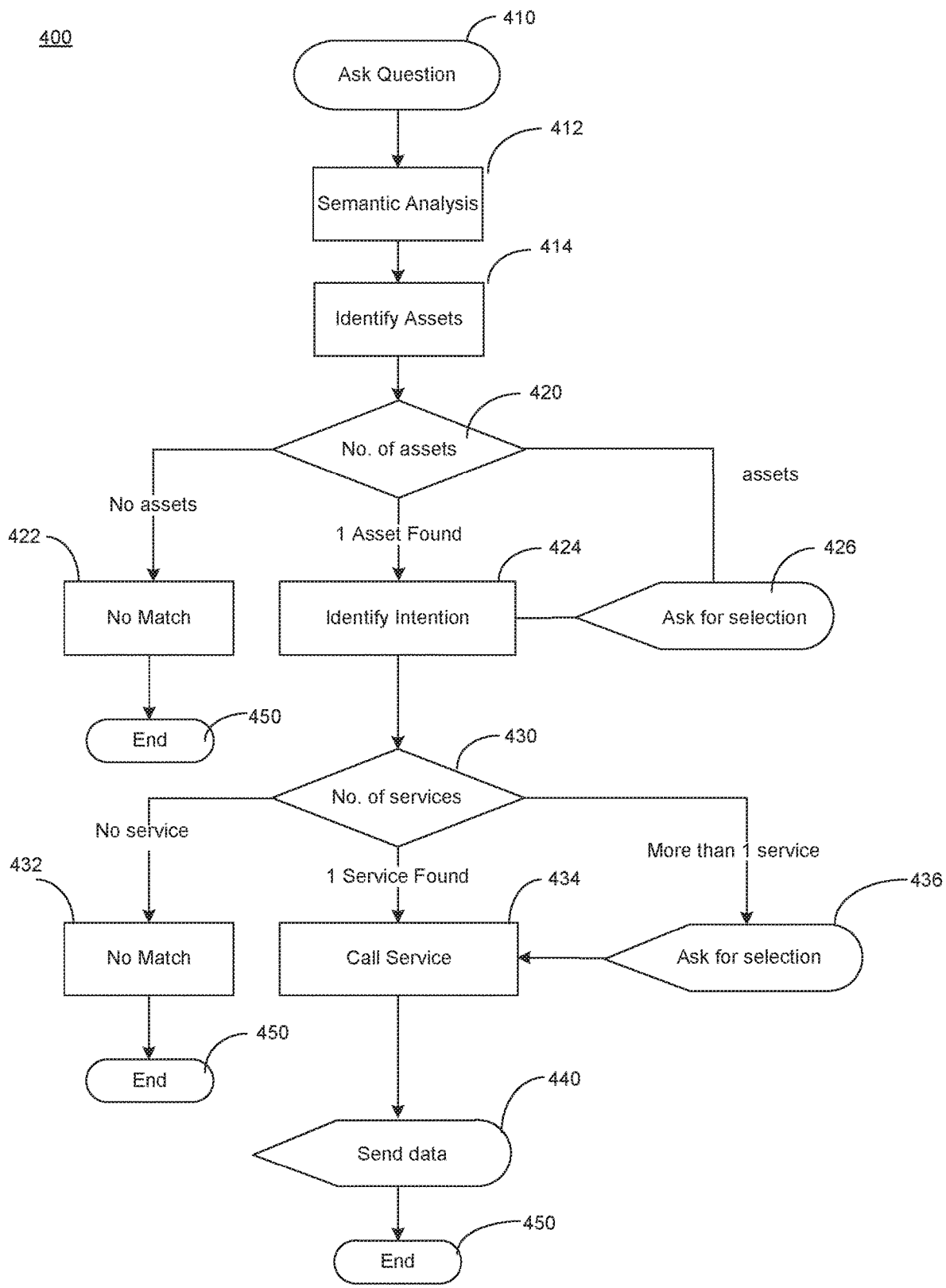
FIG. 4 is a flow chart illustration of an example method to answer a query, in accordance with the principles of the present invention.

FIG. 4 is a flow chart illustration of an example method that may be implemented by service discovery module 350 in query processor 300 to answer the query, in accordance with the principles of the present invention. Method 400 may begin with receiving a query (e.g., ask question 410), conducting semantic analysis (412), discovering or identifying assets (414), and determining the number of matching assets found (420).

If no matching assets are found (422), method 400 ends at 450. If one matching asset is found, method 400 includes identifying an intention of the end-user (424). If more than one matching asset is found, the method includes asking for a user selection of one of the matching assets found (426) and then proceeds to identifying the intention of the end-user at 424.

In method 400, identifying the intention of the end-user at 424 includes discovering or identifying services for performing the intention, and determining the number of matching services found (430).

If no matching services are found (432), method 400 ends at 450. If one matching service is found, method 400 includes calling the service (434). If more than one matching service is found, method 400 includes asking for a selection of one of the matching services (436) and then proceeds to calling the service at 434. Method 400 further includes sending data received from the called service to answer the query (440) before ending at 450.

Hierarchical Modelling of Assets

In example implementations of the NLQ processing solutions described herein, the flow of method 400 (i.e., match subjects then match available intentions, and answer the query) may be supported by modelling system assets (e.g., business database objects) in manner that allows subjects and intentions to be mapped (i.e., match subjects then match available intentions, and create the query). Modelling the system assets may involve the system assets in a hierarchical model.

Figure 5:
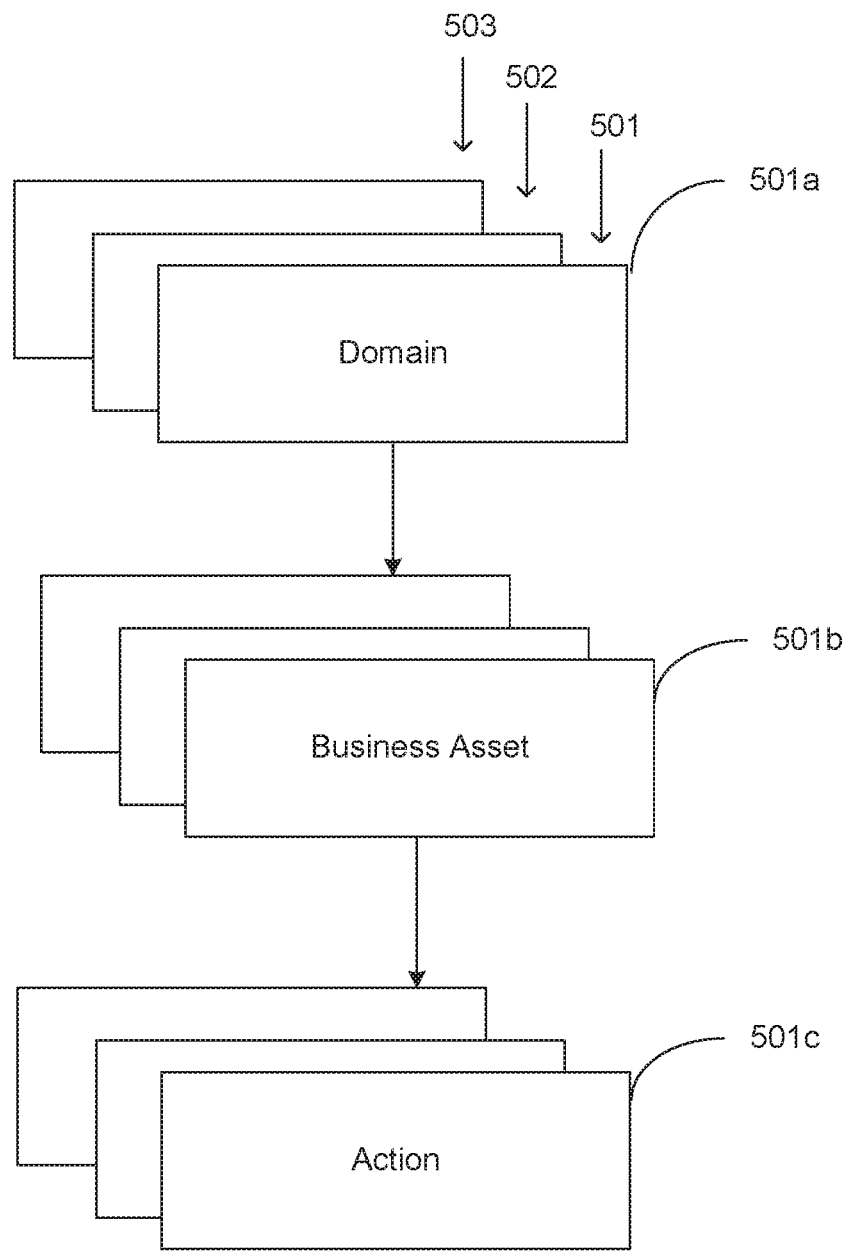
FIG. 5 is a block diagram illustration of a hierarchical model of system assets, in accordance with the principles of the present disclosure.

FIG. 5 shows an example hierarchical model 500 of system assets, in accordance with the principles of the present disclosure. Model 500 may include multiple types (e.g., types 501, 502, 503) of system assets, and for each type (e.g., type 501)—a hierarchy of a domain model (e.g. domain 501*a*), an asset model (e.g., asset model 501*b*), and action model (e.g., action model 501*c*).

In example implementations, the domain and asset models may relate to an actual service representing the asset. Use of the concept of a domain allows assets to be distinguished across different industries and areas of business. For example, there may be numerous forms of an asset (e.g., multiple suppliers). With the concept of domains, a supplier in a domain (e.g., medical equipment industry) may, for example, be distinguished from a supplier in the invoice management domain.

In example implementations of the NLQ processing solutions described herein, services may be described according to their domain, object type, and actions (or operations) that can be performed upon them. Further, a common semantic model may be used for objects in the systems that are modelled, so that relationships and dependencies between different objects can be accurately modelled. The common semantic model may be shared with previously described contextual services so that a context object can similarly be analyzed to ascertain if the context object is referred to in the query. In general in the NLQ processing solutions described herein, contextual objects and associations may use the same modelling system and semantics as those used for service descriptions so that query models can be related to the system model.

A common semantic model may underpin the matching capabilities of the NLQ processing solutions described herein. For example, a first product that relates to a sale in a sales domain in the system can be distinguished from a second product that relates to purchasing in the procurement domain via hierarchical semantic modelling. Alternatively, the common semantic model may allow determination of whether two products are indeed the same entity and exposing the same data, even if the products are referred to differently in a core data model.

Figure 6:
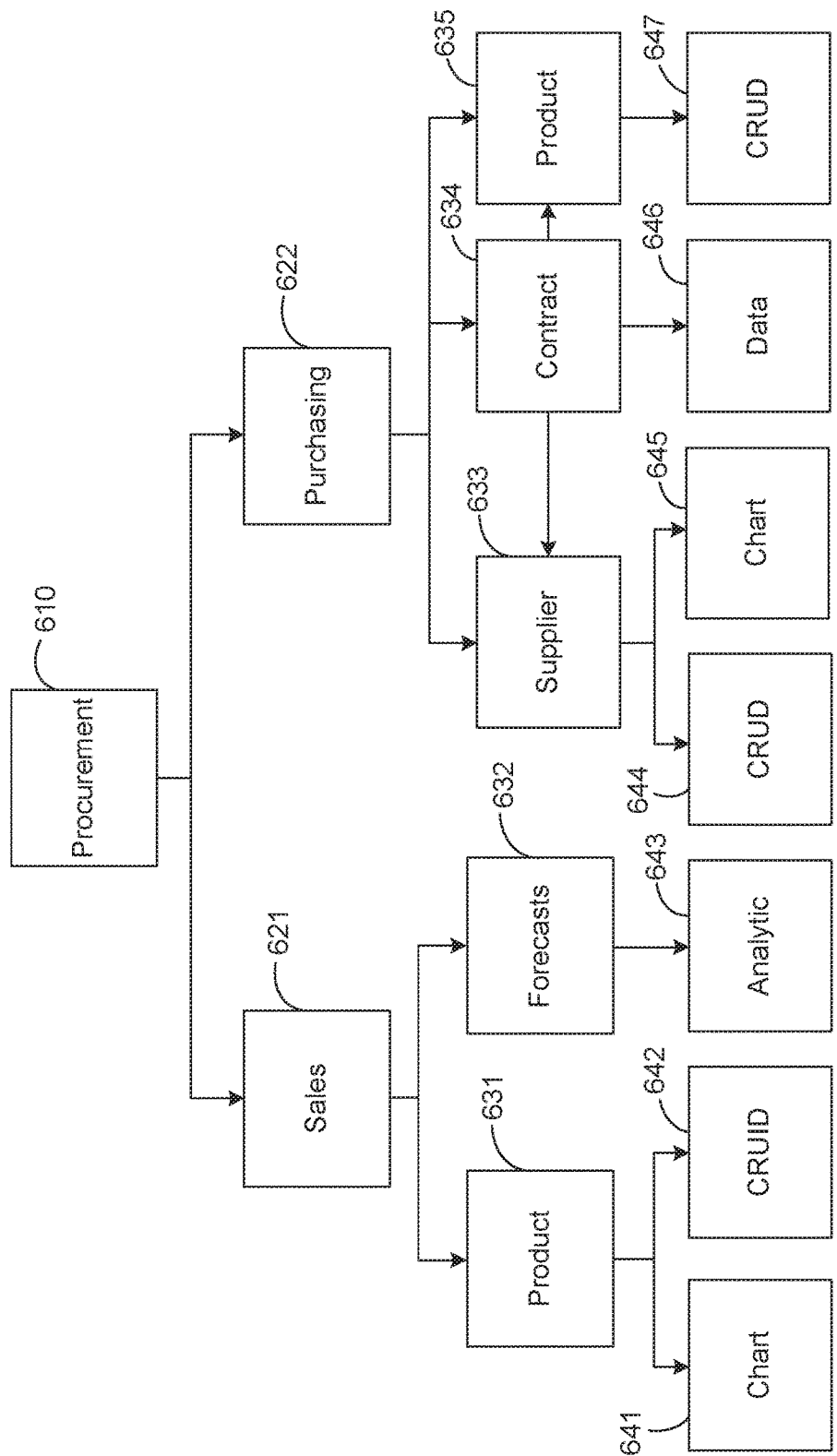
FIG. 6 is a block diagram illustration of a hierarchical model in which assets of a procurement domain are structured in a hierarchy of layers or levels, in accordance with the principles of the present disclosure.

FIG. 6 shows a hierarchical model 600 in which assets of a procurement domain are structured in a hierarchy of layers or levels, in accordance with the principles of the present disclosure. In hierarchical model 600 assets/services (e.g., Domain 610, Sales 621, Purchasing 622, Product 631, Forecasts 632, Supplier 633, Contract 634, Product 635, Chart 641, CRUD 642, Analytical 643, CRUD 644, Chart 645, Data 646 and CRUD 647) are arranged in a hierarchy that is shown in FIG. 6, for example, as an inverted tree. Actions (e.g., Chart 641, CRUD 642, Analytical 643, CRUD 644, Chart 645, Data 646 and CRUD 647) of each of the assets/services in the procurement domain 610 form the leaf nodes of the hierarchy tree. These actions (e.g., Chart 641, CRUD 642, Analytical 643, CRUD 644, Chart 645, Data 646 and CRUD 647) can relate to the operations performed by each service (as in OData modelling).

In the NLQ processing solutions described herein, the mapping of the natural language query to a given node in the hierarchy tree may be based on the subject and intention analysis. Use of the hierarchy tree improves performance of query-asset mapping processes by limiting the possibilities of what the user intends and which subjects they require. For example, by determining the domain or subject of the query, the next layer of the hierarchy (i.e., the nodes underneath) will represent which assets are available for that domain. The domain or subjects from top to bottom of the hierarchy tree can be determined via context. As an example, consider a situation in which a contract object is presented to the user. It may be determined from the context object that the user is in the Procurement/Purchasing domain (FIG. 6) when looking at the contract. So when the user submits a query: "product detail," it may be possible to then determine from context that the product being spoken of in the query is related hierarchically to contract (i.e., contract 634) in the Procurement/Purchasing domain.

When ambiguity arises in the expression of a natural language query, the use of the hierarchy tree can ascertain what possible objects or intentions are available for matching by determining if there are more than one child nodes available (for matching the query) when traversing the hierarchy tree to an end-node. For instance given an open query "show me purchasing data" in which the subject is ambiguous, the NLQ processing solutions can identify the "purchasing 622" node in the hierarchy, and determine that there three possible matching assets (e.g., supplier 633, contract 634 and product 635).

In an example implementation, these three options (e.g., supplier 633, contract 634 and product 635) under the purchasing 622 node can be presented to the end-user for selection (or the system can reason on them as described in 5.2.1.3), and then the traversal can continue depending upon the response from the user until the next ambiguity is detected. As an example, at this stage of the traversal, the end-user may have selected "supplier 633."

In an example implementation, the subject (e.g., "supplier") of the original query: "show me supplier data", of the end-user can be categorized by the semantic analysis and updated to "procurement supplier" as in: "show me procurement supplier data."

The NLQ processing solutions may record the user feedback or user selections so that next time a NLQ asks for procurement supplier data an accurate choice between Supplier, Contract, and Product in the procurement domain can be automatically made without having to ask the user for selection.

Further, in this example, after the end-user has selected "supplier 633" the traversal of the hierarchy tree to an end leaf node is not yet complete. He or she may have two options to display the data (e.g., Chart 645 as a chart (analytic) or CRUD 644 sequential objects (list)). After end-user selection, the leaf node (e.g., Chart 645 or CRUD 644) can be determined. The corresponding service can be discovered by the NLQ processing solutions via metadata attached to the asset node (such as an OData or REST endpoint), and the action relating to an operation or function of that service. The NLQ processing solutions can call the service, and return results to the user as an answer to the query.

In example implementations, the NLS solutions for accurately determining exactly which one asset or flow through the hierarchy tree maps a query to a service operation may be further enhanced with machine learning based on feedback or input received from the end user (e.g., when selecting "supplier 633" or when selecting options to display data in the example above).

Machine learning can be used to improve accuracy of determining which nodes (assets) in the hierarchy match the query. Machine learning may be deployed in two approaches: in a first approach, by enriching the modelling of each node in the hierarchy tree with natural language descriptions; and in a second approach, by recording the results of actual mapping the first query and using this data to power a neural network that learns what users query to what they finally select.

In an example implementation of machine learning in the first approach for the NLQ processing solutions described herein, machine learning may involve enriching the description of each node (asset) in the hierarchy of assets. Text classification methods (such as Naïve Bayes Classifiers) can be used to classify whether a portion of natural language is indicative of larger corpuses of text. The methods may be similar to the methods used commonly in spam filter technology in which examples of spam emails and neutral email are obtained used to build a text classification network. When a new email is presented, the words and phrases in the new email are analysed against the text classifier network to indicate whether it should be classified as spam or not.

The text classification methods here may involve determining if a natural language token (such as supplier) or a complete sentence could be classified to a particular node in the hierarchy tree (or rather, the asset such as a service or operation that the node represents). Documentation of services, domains, and other metadata that exists (such as UI labels) all contain natural language, and could serve as the input to a text classifier on each level of the tree where a query matching decision needs to be made.

Figure 7:
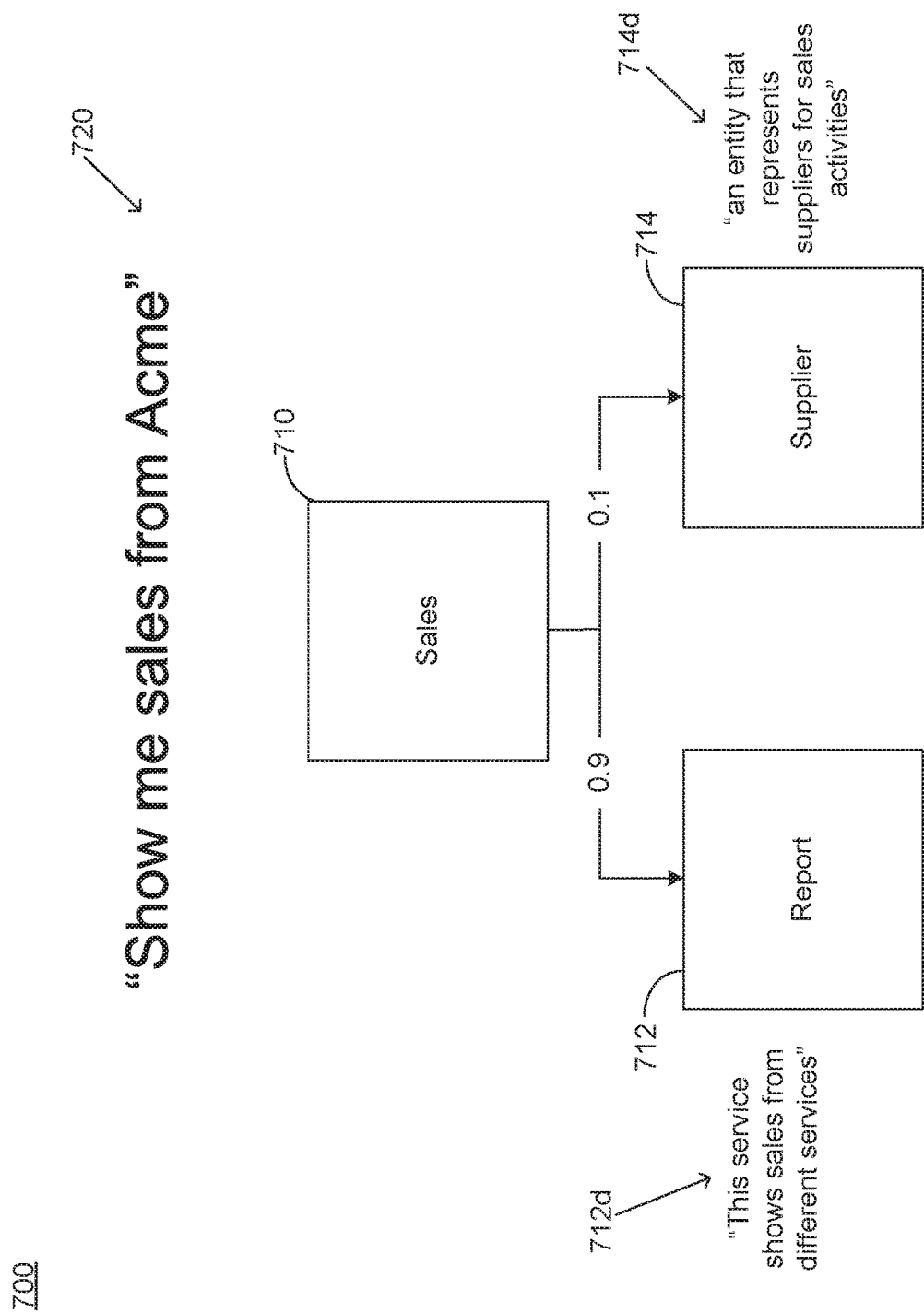
FIG. 7 is an illustration of a scenario in which a query is to be matched to assets in a hierarchy tree of assets, in accordance with the principles of the present disclosure.

FIG. 7 shows, for example, a scenario in which a query 720 (e.g., "show me sales from Acme" is to be matched to assets (e.g., sales 710, report 712 and supplier 714) in a hierarchy tree of assets (e.g., tree 700), in accordance with the principles of the present disclosure.

A reporting service for sales may have documentation (e.g., documentation 712*d*) describing the core behavior of the sales entity. Similarly, a reporting service for sales may have documentation (e.g., documentation 714*d*) describing the core behavior of the supplier entity. A text classifier may compare the words in query 720 with documentation 172*d* and documentation 174*d*, and conclude, for example, with a confidence level of 0.9 (i.e., 90% confident) that report 712 is the correct classification or matching of query 720: "show me sales from Acme," as the words and phrases of the query appear more commonly in documentation 172*d* of report 712 *r* rather than in documentation 174*d* of supplier 714.

In example implementations of the NLQ processing solutions described herein, natural language documentation and descriptions of entities may be collected and analysed to enhance the abilities of mapping natural language tokens in queries against services in a hierarchical tree of assets. It will be noted that since documentation for a child node contains information that also describes or relates to its parent node (e.g., the documentation 174*d* of report node 712 can also be used to describe sales node 710 as it is its parent), determination of which node in the tree is the right match for the query increases as more and more documentation is collected and the more assets are modelled.

In an example implementation of machine learning for the NLQ processing solutions described herein under the second approach, machine learning may involve employing a neural network that takes as input the original query from the user, and further takes as output the tree node that is traversed to as an answer to the query. Feedback from the end-user that a correct (or incorrect) answer was identified may train the neural network learn to arrive at correct answers. In some implementations, the trained neural network may override the text classification or manual user indications, to suggest a correct end operation for an ambiguous query. In example implementations of NLQ processing solutions described herein, all traversals from original query to end operation may be logged and made accessible for machine learning algorithms.

With renewed reference to FIG. 3, service discovery module 350 of query processor 300 may include a discovery component 351, a hierarchy model 352, a model management component 354, a historical user flows store 354, a machine learning (ML) user flow module 355, a documentation/metadata parser 356, a classifier 357, and a clarification enactor 358.

Since context relator 332 also requires access to hierarchy model 352 and similar techniques, service discovery module 350 may itself be considered to be a service, which exposes hierarchy model 352 for query from a client that wishes to analyze a natural language query, for example, by determining sibling nodes, determining parent nodes, and determining child nodes of hierarchy model 352

Discovery component 351 in service discovery module 350 of query processor 300 may be configured to receive as input the context-enhanced query model provided by context and semantic services of query processor 300, for example, via context relator 332. Discovery component 351 may relate or match the subjects and context of the query, against the assets in the hierarchy model (e.g., hierarchy model 352) level by level. When an ambiguity in matching the query to assets in the hierarchy is found (e.g., two or more likely matching assets are found), discovery component 351 may query classifier 357 for confidence levels of matching. Classifier 357 reads data services which provide documentation and natural language assets to describe an entity in hierarchy model 352. Classifier 357 then creates a text classifier from this documentation and compares the query against it, returning confidence scores against each possible node in the hierarchy back to discovery component 351.

Classifier 357 may be configured (in conjunction with document/metadata parser 356) to determine confidence levels of query-asset matchings in the hierarchy tree (in conjunction with document/metadata parser 356) based on analysis of documentation associated with the assets. Discovery component 351 may select the query-asset match with the confidence level as the matching asset. Alternatively or additionally, classifier 357 may query ML user flow module 355 to determine if the end-user had previously asked the same query and received a positive result. Discovery component 351 may select the matching asset according to the previous positive result.

If neither document/metadata parser 356 or ML user flow module 355 provide a matching result with high confidence, discovery component 351 may, via clarifier component 358, present the two or more likely matching assets to the end-user user for clarification or selection. Discovery component 351 may choose the user-selection (received via clarifier component 358) as the matching asset.

Once discovery component 351 reaches an end-node of the hierarchy while matching assets in the hierarchy model, discovery component 351 may return the service and operation to be invoked for the query to query transformation component 360 which then determines how the call should be made based on the original query tuple. The entities and query forms of the service may be provided in an entity to ID relationships data set.

In example implementations of query processor 300, query transformation module 360 includes an entity mapper 362 and one or more call mapping units (e.g., call mapping unit 364, call mapping unit 366)). Each call mapping unit may be specific to a data exchange standard or protocol. For example, call mapping unit 364 may be configured for OData protocol data exchanges via SAP OData services 370.

After query transformation component 360 receives information from discovery component 351 on the service and operation to be invoked for the query, query transformation component 360 determines how the service call should be made based on the original query tuple. The query entities and query forms of the service may be provided in an entity to ID relationships data set. Query transformation component 360 may set up the call to match the original intention and criteria given in the natural language query.

Entity mapper 362 in query transformation module 360 may map entity forms used in the original query to forms for the service, and sends mapping to a call planner (e.g., call mapping unit 364) which then forms a set of queries necessary based on the type of service. The call planner may contain the domain knowledge of how to form queries relevant to the service standards, such as OData.

In an example implementation, query transformation component 360 may be configured to set up the call using OData services 370. With the OData standard, the manner in which OData services can be called is standardized. The query forms for filtering information, for example, are applicable across all services that are OData based. Similarly HTTP verbs are used to indicate the various actions required (GET, PUT etc.) from the request. In an example implementation, intentions provided by semantic analysis component and provided in the query model tuple may be relatable to OData query forms (such as GET, PUT) and $Filter, $* forms.

A service may require an entity ID to be included in a query to be able to respond correctly. A natural language query will rarely refer to an entity by an ID. For example, a natural language query might say "show me the address of Mary Allen", rather than refer to the name Mary Allen by the ID as stored, for example, within a human resources data table. However, often a service to retrieve Mary Allen's address from the data table may not have its own text searching and filtering behavior, and thus may require the ID rather than a string parameter of the name Mary Allen to retrieve Mary Allen's address from the data table.

In the NLQ processing solutions described herein, mapping between string literal descriptions of entities in a query and their system identities is performed and is modelled so that the desired service call can be made.

The mapping between string literal descriptions of entities in a query and their system identities may produce a service call sequence, where a set of calls may be required to retrieve the correct information necessary to make the originally desired call. For example, the query: "show me the address of Mary Allen", may be called as {Subject: Person, intent: show, criteria: Mary Allen} -> Service GET /people/

However the /people/ service may only accept an ID for the person, but not the string "Mary Allen". Another call may be required to retrieve the ID of "Mary Allen": Service GET /people/id/{name}/top/1

Accordingly, query transformation component 360 may construct a service call sequence:
1. GET /people/id/Mary Allen/top/1
2. GET /people/{id from 1}

Query transformation component 360 may send this call sequence to an invocation engine (e.g., call mapping unit 364 or 362) to invoke.

Query processor 300 as used in the NLQ processing solutions described herein may be operated in two phases: a runtime phase in which natural language queries are processed as described in the foregoing; and an onboarding phase in which services are introduced and registered to the infrastructure. In the onboarding phase, a service can included in the architecture via registration, service modelling performed and the hierarchical model updated. The onboarding phase may be supervised by service provisioning module 340, which may include a service analyzer 342, a service registration unit 344, and a model integrator 346.

In the onboarding phase, service registration unit 344 may receive a request to include a new service within the NLQ processing infrastructure and allow the service to be discovered to service natural language queries. Service analyzer 342 may analyze the service, its metadata (e.g., available in metadata sources 32), and underlying models (such as its data models) that may be available (e.g., available in metadata sources 32). Service analyzer 342 may build a service model and text classifications of the service from such sources. Further, model integrator 346 (in conjunction with model managment unit 353) may update the hierarchical model (e.g., hierarchy model 352) used for query processing in service discovery module 350 with the new service model incorporated.

In the runtime phase, after query receiver receives an incoming natural language query and context is used to enrich the query, service models including the new service model may be queried in service discovery module 350 (and machine learning applied). The newly registered service is available to be invoked if needed after the query is transformed.

The various systems and techniques described herein may be implemented in digital electronic circuitry, or in computer hardware, firmware, software, or in combinations of them. The various techniques may implemented as a computer program product, i.e., a computer program tangibly embodied in an information carrier, e.g., in a machine readable non-transitory storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a standalone program or as a module, component, subroutine, or other unit suitable for use in a computing environment. A computer program can be deployed to be executed on one computer or on multiple computers at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magnetooptical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magnetooptical disks; and CDROM and DVD-ROM disks. The processor and the memory may be supplemented by, or incorporated in special purpose logic circuitry.

Implementations may be implemented in a computing system that includes a backend component, e.g., as a data server, or that includes a middleware component, e.g., an application server, or that includes a frontend component, e.g., a client computer having a graphical user interface or a Web browser through which a user can interact with an implementation, or any combination of such backend, middleware, or frontend components. Components may be interconnected by any form or medium of digital data communication, e.g., a communication network. Examples of communication networks include a local area network (LAN) and a wide area network (WAN), e.g., the Internet.

What is claimed is:

1. A method for answering a natural language query (NLQ) directed to a database system, the method, executed by one or more processors, comprising:
    receiving at a query processor, a NLQ directed to the database system;
    modeling, by the query processor, the NLQ as a tuple of entities including at least a subject entity, a criteria entity, and an intention entity, wherein modeling the NLQ includes a semantic analysis of the NLQ, wherein modeling further includes a context enrichment of the NLQ comprising:
        enriching the NLQ with a unique query identifier and one or more context entities, wherein the one or more context entities are referred to and used to resolve associations between NLQs; and
        enriching the NLQ with a session identifier, wherein a session is defined by usage of an application over a time period and defined by a context of the session, wherein the session contains one or more NLQs with same subjects or referral to a same query, and wherein the session identifier is defined based on matching subjects;
    discovering, by the query processor, a specific database system asset for answering the NLQ by evaluating system model descriptions of database system assets against the enriched NLQ, wherein the discovering includes, in response to identifying two or more matching database system assets, providing a request for presentation to a user associated with the NLQ for a selection from the two or more matching database system assets;
    in response to receiving a selection of the specific database system asset from the two or more matching database system assets, transforming the NLQ into a native service call for the specific database system asset; and
    invoking, by the query processor, the native service call for callback of the specific database system asset to answer the NLQ.

2. The method of claim 1, wherein evaluating system model descriptions of database system assets against the NLQ includes adding information from natural language documentation associated with the database system assets to the system model descriptions of the database system assets.

3. The method of claim 1, wherein evaluating system model descriptions of database system assets against the NLQ includes using a text classification method for the evaluating the system model descriptions of database system assets against the NLQ.

4. The method of claim 3, wherein using a text classification method includes using a naïve Bayes text classification method.

5. The method of claim 3, wherein using a text classification method includes determining confidence levels of query-asset matchings obtained by text classification and identifying the specific database system asset for answering the NLQ based on the confidence levels of query-asset matchings.

6. The method of claim 1, wherein discovering a specific database system asset for answering the NLQ includes machine learning and using a machine learning result to resolve cases of ambiguous discovery.

7. A computer program product, the computer program product being tangibly embodied on a non-transitory computer-readable storage medium and comprising instructions that, when executed, by one or more processors, are configured to cause at least one computing device to answer a natural language query (NLQ) directed to a database system by:
    receiving at a query processor, a NLQ directed to the database system;
    modeling, by the query processor, the NLQ as a tuple of entities including at least a subject entity, a criteria entity, and an intention entity, wherein modeling the NLQ includes a semantic analysis of the NLQ, wherein modeling further includes a context enrichment of the NLQ comprising:
        enriching the NLQ with a unique query identifier and one or more context entities, wherein the one or more context entities are referred to and used to resolve associations between NLQs; and enriching the NLQ with a session identifier, wherein a session is defined by usage of an application over a time period and defined by a context of the session, wherein the session contains one or more NLQs with same subjects or referral to a same query, and wherein the session identifier is defined based on matching subjects;

discovering, by the query processor, a specific database system asset for answering the NLQ by evaluating system model descriptions of database system assets against the enriched NLQ, wherein the discovering includes, in response to identifying two or more matching database system assets, providing a request for presentation to a user associated with the NLQ for a selection from the two or more matching database system assets;

in response to receiving a selection of the specific database system asset from the two or more matching database system assets, transforming the NLQ into a native service call for the specific database system asset; and invoking, by the query processor, the native service call for callback of the specific database system asset to answer the NLQ.

8. The computer program product of claim 7, wherein the instructions, when executed, further cause the at least one computing device to:
add information from natural language documentation associated with the database system assets to the system model descriptions of the database system assets.

9. The computer program product of claim 7, wherein the instructions, when executed, further cause the at least one computing device to:
use a text classification method for the evaluating the system model descriptions of database system assets against the NLQ.

10. The computer program product of claim 9, wherein the instructions, when executed, further cause the at least one computing device to:
use a naïve Bayes text classification method for the evaluating the system model descriptions of database system assets against the NLQ.

11. The computer program product of claim 9, wherein the instructions, when executed, further cause the at least one computing device to:
determine confidence levels of query-asset matchings obtained by text classification; and
identify the specific database system asset for answering the NLQ based on the confidence levels of query-asset matchings.

12. The computer program product of claim 7, wherein the instructions, when executed, further cause the at least one computing device to:
use a machine learning result to resolve cases of ambiguous discovery.

13. A system comprising:
at least one processor; and
at least one memory storing instructions that are executable by the at least one processor, the system including a query processor configured to answer a natural language query (NLQ) directed to a database system, the query processor including:
a query receiver configured to receive the NLQ and model the NLQ as a tuple of entities including at least a subject entity, criteria entity, and an intention entity, wherein modeling the NLQ including includes a semantic analysis of the NLQ, wherein modeling further includes a context enrichment of the NLQ comprising:
enriching the NLQ with a unique query identifier and one or more context entities, wherein the one or more context entities are referred to and used to resolve associations between NLQs; and
enriching the NLQ with a session identifier, wherein a session is defined by usage of an application over a time period and defined by a context of the session, wherein the session contains one or more NLQs with same subjects or referral to a same query, and wherein the session identifier is defined based on matching subjects;
a service discovery component configured to discover a specific database system asset for answering the NLQ by evaluating system model descriptions of database system assets against the enriched NLQ, wherein the discovery includes, in response to identifying two or more matching database system assets, providing a request for presentation to a user associated with the NLQ for a selection from the two or more matching database system assets; and
a query transformation unit configured to, in response to receiving a selection of the specific database system asset from the two or more matching database system assets, transform the NLQ into a native service call for the specific database system asset, and invoke the native service call for callback of the specific database system asset to answer the NLQ.

14. The system of claim 13, wherein the service discovery component configured to add information from natural language documentation associated with the database system assets to the system model descriptions of the database system assets.

15. The system of claim 13, wherein the service discovery component configured to use a text classification method for the evaluating the system model descriptions of database system assets against the NLQ.

16. The system of claim 15, wherein the service discovery component configured to:
determine confidence levels of query-asset matchings obtained by text classification; and
identify the specific database system asset for answering the NLQ based on the confidence levels of query-asset matchings.

17. The system of claim 15, wherein the service discovery component configured to:
use a machine learning result to resolve cases of ambiguous discovery.

* * * * *